United States Patent
Davis et al.

(10) Patent No.: US 6,821,626 B1
(45) Date of Patent: Nov. 23, 2004

(54) FLUOROCARBON RANDOM COPOLYMER FOR USE IN TONER RELEASE LAYER

(75) Inventors: Stephen V. Davis, Rochester, NY (US); Jerry A. Pickering, Hilton, NY (US); Nataly Boulatnikov, Ontario, NY (US)

(73) Assignee: NexPress Solutions LLC, Rochester, NY (US)

(*) Notice: Subject to any disclaimer, the term of this patent is extended or adjusted under 35 U.S.C. 154(b) by 0 days.

(21) Appl. No.: 09/450,302

(22) Filed: Nov. 29, 1999

(51) Int. Cl.[7] ................ B32B 27/06; B32B 27/20; B32B 27/26; B32B 27/28

(52) U.S. Cl. ............ 428/421; 428/329; 428/422; 526/242; 526/250; 526/253; 526/255; 524/430; 524/431; 524/432

(58) Field of Search ................ 428/421, 422, 428/328, 329; 524/430, 431, 432, 434, 435; 526/242, 250, 253

(56) References Cited

U.S. PATENT DOCUMENTS

| | | | |
|---|---|---|---|
| 4,257,699 A | 3/1981 | Lentz | |
| 4,264,181 A | 4/1981 | Lentz et al. | |
| 4,272,179 A | 6/1981 | Seanor | |
| 4,373,239 A | 2/1983 | Henry et al. | |
| 4,430,406 A | 2/1984 | Newkirk et al. | |
| 4,515,884 A | 5/1985 | Field et al. | |
| 4,518,655 A | 5/1985 | Henry et al. | |
| 4,970,098 A | 11/1990 | Ayala-Esquilin et al. | |
| 5,017,432 A | 5/1991 | Eddy et al. | |
| 5,248,339 A * | 9/1993 | Fitzgerald et al. | 118/60 |
| 5,269,740 A | 12/1993 | Fitzgerald et al. | |
| 5,292,562 A | 3/1994 | Fitzgerald et al. | |
| 5,292,606 A | 3/1994 | Fitzgerald | |
| 5,336,539 A | 8/1994 | Fitzgerald | |
| 5,466,533 A | 11/1995 | Fitzgerald et al. | |
| 5,474,821 A | 12/1995 | Kass | |
| 5,480,724 A | 1/1996 | Fitzgerald et al. | |
| 5,709,949 A * | 1/1998 | Chen et al. | 428/421 |
| 5,906,881 A * | 5/1999 | Chen et al. | 428/141 |
| 6,113,830 A * | 9/2000 | Chen et al. | 264/241 |

* cited by examiner

*Primary Examiner*—Vivian Chen

(57) ABSTRACT

A fuser member comprising a core and a layer overlying the core, the layer including a cured fluorocarbon random copolymer having subunits of:

$$-\!(CH_2CF_2)_x\!-, -\!(CF_2CF(CF_3))_y\!-, \text{ or } -\!(CF_2CF_2)_z\!-,$$

wherein x is from 30 to 90 mole percent,
 y is from 10 to 70 mole percent,
 z is from 0 to 34 mole percent; and
 x+y+z equals 100 mole percent;
the layer further including particulate filler having zinc oxide and yellow iron oxide.

14 Claims, 1 Drawing Sheet

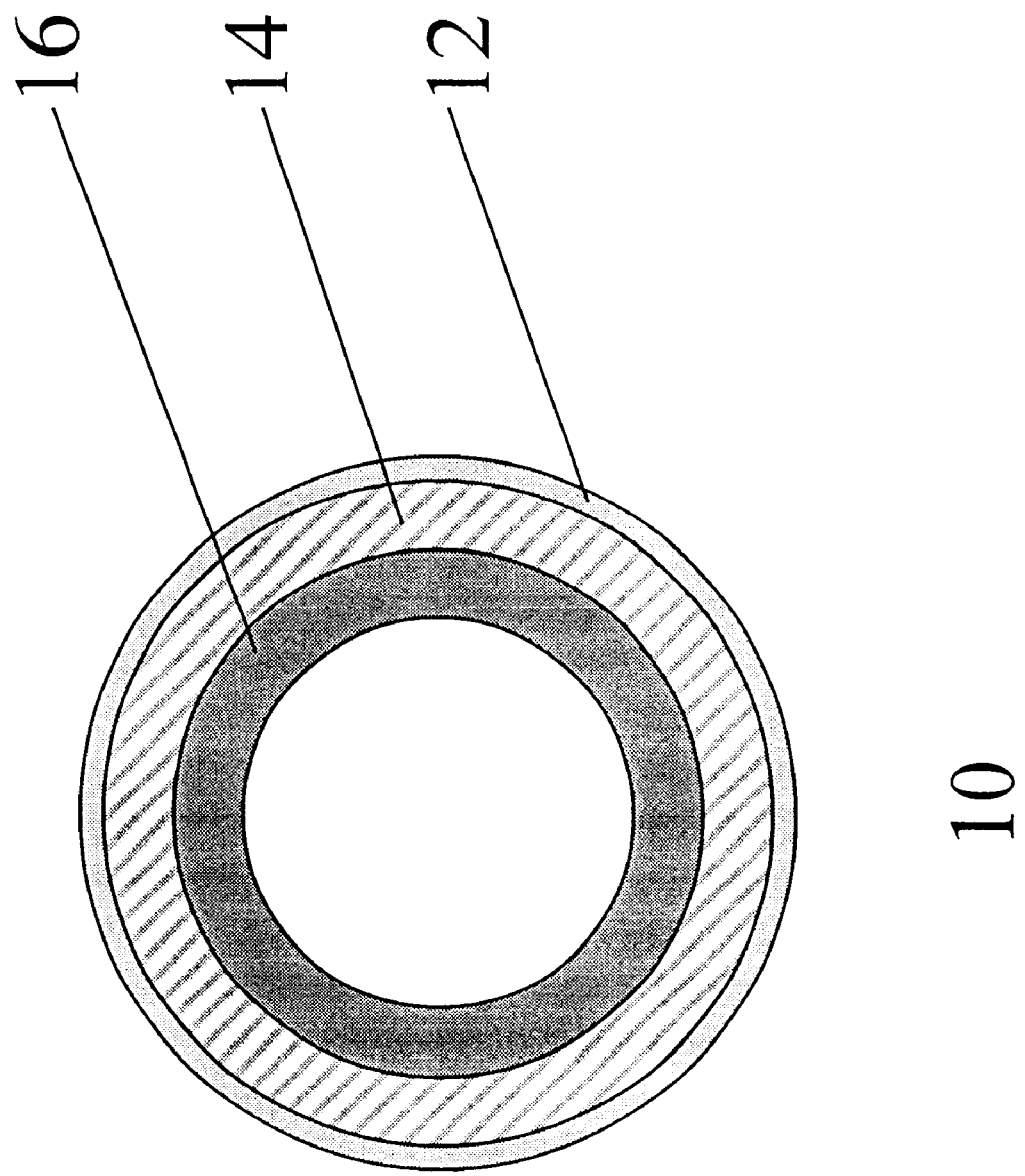

FLUOROCARBON RANDOM COPOLYMER FOR USE IN TONER RELEASE LAYER

RELATED APPLICATION

Copending U.S. patent application Ser. No. 09/451,307, filed on even date herewith entitled "Fluorocarbon Random Copolymer For Use In Toner Release Layer", is a related application.

FIELD OF THE INVENTION

This invention relates to fuser members useful for heat-fixing a heat-softenable toner material to a substrate. More particularly, the invention relates to materials usable as a toner release layer in a fuser member.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, e.g., a receiver sheet comprising paper or a transparent film, where it is then fixed in place to yield the final desired toner image.

When heat-softenable toners, comprising, e.g., thermoplastic polymeric binders, are employed, the usual method of fixing the toner in place involves applying heat to the toner once it is on the receiver sheet surface to soften it and then allowing or causing the toner to cool.

One such well-known fusing method comprises passing the toner-bearing receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll. In some other fusing methods, the configuration is varied and the "fuser roll" or "pressure roll" takes the form of a flat plate or belt. The description herein, while generally directed to a generally cylindrical fuser roll in combination with a generally cylindrical pressure roll, is not limited to fusing systems having members with those configurations. For that reason, the term "fuser member" is generally used herein in place of "fuser roll" and the term "pressure member" in place of "pressure roll".

The fuser member usually comprises a rigid core covered with a resilient material, which will be referred to herein as a "base cushion layer." The resilient base cushion layer and the amount of pressure exerted by the pressure member serve to establish the area of contact of the fuser member with the toner-bearing surface of the receiver sheet as it passes through the nip of the fuser member and pressure members. The size of this area of contact helps to establish the length of time that any given portion of the toner image will be in contact with and heated by the fuser member. The degree of hardness (often referred to as "storage modulus") and stability thereof, of the base cushion layer are important factors in establishing and maintaining the desired area of contact.

In some previous fusing systems, it has been advantageous to vary the pressure exerted by the pressure member against the receiver sheet and fuser member. This variation in pressure can be provided, for example in a fusing system having a pressure roll and a fuser roll, by slightly modifying the shape of the pressure roll. The variance of pressure, in the form of a gradient of pressure that changes along the direction through the nip that is parallel to the axes of the rolls, can be established, for example, by continuously varying the overall diameter of the pressure roll along the direction of its axis such that the diameter is smallest at the midpoint of the axis and largest at the ends of the axis, in order to give the pressure roll a sort of "bow tie" or "hourglass" shape. This will cause the pair of rolls to exert more pressure on the receiver sheet in the nip in the areas near the ends of the rolls than in the area about the midpoint of the rolls. This gradient of pressure helps to prevent wrinkles and cockle in the receiver sheet as it passes through the nip. Over time, however, the fuser roll begins to permanently deform to conform to the shape of the pressure roll and the gradient of pressure is reduced or lost, along with its attendant benefits. It has been found that permanent deformation (alternatively referred to as "creep") of the base cushion layer of the fuser member is the greatest contributor to this problem.

Particulate inorganic fillers have been added to base cushion layers to improve mechanical strength and thermal conductivity. High thermal conductivity is advantageous when the fuser member is heated by an internal heater, so that the heat can be efficiently and quickly transmitted toward the outer surface of the fuser member and toward the toner on the receiver sheet it is intended to contact and fuse. High thermal conductivity is not so important when the roll is intended to be heated by an external heat source.

Optimal metal-particle filled elastomer fuser members have long been sought. At one time, it was predicted that:

"The metal of the metal-containing filler dispersed in the elastomer may be easily selected by one skilled in the art without undue experimentation by testing the metal-containing filler, such as a metal, metal alloy, metal oxide, metal salt or other metal compound, in an elastomer. The general classes of metals which are applicable to the present invention include those metals of Groups 1b, 2a, 2b, 3a, 3b, 4a, 4b, 5a, 5b, 6b, 7b, 8 and the rare earth elements of the Periodic Table." (U.S. Pat. No. 4,264,181 to Lentz et al, column 10, lines 42–53; also U.S. Pat. No. 4,272,179 to Seanor, column 10, lines 45–54.)

This prediction of easy selection of the metal for a metal-containing filler has proven false in the face of later efforts in the art. A metal-containing filler which provides good results in one elastomer may provide very poor results in another elastomer, even if the elastomers are very similar.

U.S. Pat. No. 4,515,884 to Field et al, discloses a fuser member which utilizes metal oxide filled polydimethylsiloxane. The metal oxides are iron oxide and tabular alumina. Calcined alumina is described as being unsuitable per se. (column 9. line 50-column 10 line 47)

In U.S. Pat. No. 4,264,181 to Lentz et al, good results were obtained when lead oxide was used as a filler in various fluorocarbon elastomers (Viton E430™, Viton E60C™, Viton GH™; Examples X, XI, XII). U.S. Pat. No. 5,017,432 to Eddy et al, on the other hand, teaches against the use of lead oxide in similar fluorocarbon elastomers (for example, Viton GF™) on the basis that it would produce an unacceptable fuser member. In these fluoroelastomers, cupric oxide is preferred.

U.S. Pat. No. 4,272,179 to Seanor and U.S. Pat. Nos. 4,264,181 and 4,257,699 to Lentz teach the use, as a release oil, of a polydimethylsiloxane that incorporates mercapto functional groups. These patents indicate that lead oxide filler in the outer elastomer layer interacts with the mercapto functionalized PDMS fluid to yield a release film on the surface of the fuser member.

Preparation of metal containing elastomers remains problematic. U.S. Pat. No. 4,515,884 to Field et al, and U.S. Pat. No. 5,017,432 to Eddy et al, cite large numbers of critical features or important aspects of their metal containing elastomers: choice of material (Field, column 9, lines 50–65 and column 10, lines 24–25), interaction of filler surface and elastomer (Field, column 9, lines 32–65), particle size (Field, column 10, lines 1–8 and lines 25–30; Eddy, column 9, line 65-column 10, line 3), concentration of metal-filler (Field, column 10, lines 9–23 and lines 31–47), capability of interacting with functional groups of release agent (Eddy, column 9, lines 26–30), reactivity of the metal filler with the elastomer (Eddy, column 9, lines 33–43), and acid-base characteristics of the metal filler (Eddy, column 9, lines 43–56). The lists of critical features and important aspects in Field and Eddy do not fully correlate. It is unknown whether this difference represents real differences in material characteristics or only differences in techniques and analysis.

In electrophotographic fuser systems, fuser members are commonly made with an overcoat layer of polysiloxane elastomer, polyfluorocarbon resin, or polyfluorocarbon elastomer.

Polysiloxane elastomers have relatively high surface energy and relatively low mechanical strength, but are adequately flexible and elastic and can produce high quality fused images. After a period of use, however, the self release property of the roller degrades and offset begins to occur. Application of a polysiloxane fluid during roller use enhances the ability of the roller to release toner, but shortens roller life due to oil absorption. Oiled portions tend to swell and wear and degrade faster.

One type of material that has been widely employed in the past to form a resilient base cushion layer for fuser rolls is condensation-crosslinked siloxane elastomer. Disclosure of filled condensation-cured poly(dimethylsiloxane) "PDMS" elastomers for fuser rolls can be found, for example, in U.S. Pat. Nos. 4,373,239; 4,430,406; and 4,518,655. U.S. Pat. No. 4,970,098 to Ayala-Esquillin et al teaches a condensation cross-linked diphenylsiloxane-dimethylsiloxane elastomer having 40 to 55 weight percent zinc oxide, 5 to 10 weight percent graphite, and 1 to 5 weight percent ceric dioxide.

A widely used siloxane elastomer is a condensation-crosslinked PDMS elastomer, which contains about 32–37 volume percent aluminum oxide filler and about 2–6 volume percent iron oxide filler, and is sold under the trade name, EC4952, by the Emerson Cummings Co., U.S.A. It has been found that fuser rolls containing EC4952 cushion layers exhibit serious stability problems over time of use, i.e., significant degradation, creep, and changes in hardness, that greatly reduce their useful life. MER test results correlate with and thus accurately predict the instability exhibited during actual use. Nevertheless, materials such as EC4952 initially provide very suitable resilience, hardness, and thermal conductivity for fuser roll cushion layers.

Some filled condensation-crosslinked PDMS elastomers are disclosed in U.S. Pat. No. 5,269,740 (copper oxide filler), U.S. Pat. No. 5,292,606 (zinc oxide filler), U.S. Pat. No. 5,292,562 (chromium oxide filler), U.S. Pat. No. 5,480,724 (tin oxide filler), U.S. Pat. No. 5,336,539 (nickel oxide filler). These materials all show much less change in hardness and creep than EC4952 or the PDMS elastomer with aluminum oxide filler. U.S. Pat. No. 5,292,606 and U.S. Pat. No. 5,480,724 disclose that tin oxide filler and zinc oxide filler can provide very good results in PDMS. Fluorocarbon resins like polytetrafluoroethylene (PTFE) or a copolymer of PTFE and perfluoroalkylvinylether, or fluorinated ethylenepropylene have excellent release characteristics due to very low surface energies, high temperature resistance, and excellent chemical resistance. Fluorocarbon resins are, however, less flexible and elastic than polysiloxane elastomers.

Polyfluorocarbon elastomers, have been extensively studied for the field of electrophotography. Continuously, the bane of such materials are their poor contamination. The tendency for fluoroelastomers to contaminate with toner is affected significantly by the ingredients needed to cure the fluoroelastomers. The worst of these being the metal oxide and hydroxides bases needed as dehydrofluorinating agents and as acid scavengers. Another difficulty with such systems is that the presence of the materials as curatives can also adversely affect coating quality an thus reduce the image gloss the fuser member is capable of imparting. Recently effort has been placed on using organic bases for these purposes. However, the choice of materials that can both perform the necessary functions above and withstand the cure temperatures are limited. There is a need for a fluoroelastomer cure system, which does not significantly impair toner release or lead to high contamination.

SUMMARY OF THE INVENTION

The present invention provides a fuser member with an overcoat layer that includes a polyfluorocarbon elastomer which is cured in such a way as to have minimal effect on the release properties or the surface properties of the material. At the same time, the fluoroelastomer is cured to a degree sufficient to impart the necessary mechanical integrity.

The present invention also provides an improved mixture of materials for forming a toner release layer.

This is achieved in a fuser member comprising a core and a layer overlying the core, the layer including a cured fluorocarbon random copolymer having subunits of:

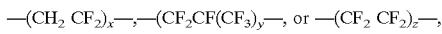

$-(CH_2\ CF_2)_x-, -(CF_2CF(CF_3))_y-,$ or $-(CF_2\ CF_2)_z-,$ wherein x is from 30 to 90 mole percent,
y is from 10 to 70 mole percent,
z is from 0 to 34 mole percent; and
x+y+z equals 100 mole percent;
the layer further including particulate filler having zinc oxide and yellow iron oxide.

The layer incorporates particulate filler. The filler includes zinc oxide and yellow iron oxide. The zinc oxide is present in an amount from 5 to 30 parts based on 100 parts of fluorocarbon random copolymer. The yellow iron oxide is present in an amount from 5 to 30 parts based on 100 parts of fluorocarbon random copolymer. The composition may further include other fillers to impart such properties as thermal conductivity or cosmetic purposes. A brief list of such fillers includes but is not limited to tin oxide, copper oxide, graphite, carbon black, and aluminum oxide.

The fuser member of the invention, formed with a toner release layer that includes a metal oxide filled polyfluorocarbon elastomer, has a moderate surface energy.

Further, images formed using the fuser member the present invention attain a higher image gloss.

A further advantage of the present invention is that the need for strong bases to cure the fluoroelastomer is eliminated.

Yet another advantage of the present invention is that less offset occurs.

BRIEF DESCRIPTION OF THE FIGURES

The above-mentioned and other features of this invention and the manner of attaining them will become more apparent and the invention itself will be better understood by reference to the following description of an embodiment of the invention taken in conjunction with the accompanying figures wherein:

FIG. 1 is a cross sectional view of a fusing member in accordance with the present invention;

DETAILED DESCRIPTION OF PARTICULAR EMBODIMENTS

FIG. 1 shows a cross sectional view of a fuser member 10 which includes fuser roller, pressure roller, oiler donor roller, oiler metering roller, preconditioning roller, etc.. The core 16 is usually metallic such as stainless steel, steel, aluminum, etc.; however, the core 16 may also be made of a ceramic or plastic. The primary requisites for core 16 materials are that it provide the necessary stiffness, be able to support the force placed upon it, and be able to withstand whatever temperature to which it is subjected. Disposed above the core 16 lies one or more optional base cushion layers 14. The outermost layer 12 is the object of the present invention. In the event that no optional intermediate layer 14 is desired then the outermost layer 12 is disposed directly over the core 16.

The outermost layer 12 is the toner release layer. It includes a cured fluorocarbon random copolymer having subunits of:

—$(CH_2\ CF_2)_x$— (vinylidene fluoride subunit ("VF")),
—$(CF_2CF(CF_3))_y$— (hexefluoropropykene subunit ("HFP")), and
—$(CF_2\ CF_2)_z$— (tetrafluoroethylene subunit ("TFE"))

wherein x is from 30 to 90 mole percent,
y is from 10 to 70 mole percent,
z is from 0 to 34 mole percent; and
x+y+z equal 100 mole percent; the layer further including particulate filler having zinc oxide and yellow iron oxide.

In these formulas, x, y, and z are mole percentages of the individual subunits relative to a total of the three subunits (x+y+z), referred to herein as "subunit mole percentages" (The curing agent can be considered to provide an additional "cure-site subunit", however, the contribution of these cure-site subunits is not considered in subunit mole percentages.) In the fluorocarbon copolymer, x has a subunit mole percentage of from 30 to 90 mole percent, y has a subunit mole percentage of from 10 to 70 mole percent, and z has a subunit mole percentage of from 0 to 34 mole percent. In a currently preferred embodiment of the invention, subunit mole percentages are: x is from 40 to 80, y is from 10 to 60, and z is from 0 to 34; or more preferably x is from 42 to 75, y is from 14 to 58, and z is 0. In the currently preferred embodiments of the invention, x, y, and z are selected such that fluorine atoms represent at least 70 percent of the total formula weight of the VF, HFP, and TFE subunits.

The outer layer includes particulate filler comprising zinc oxide and yellow iron oxide. In a currently preferred embodiment of the invention, the zinc oxide is present in an amount from 5 to 30 parts based on 100 parts of fluorocarbon random copolymer. The yellow iron oxide is present in an amount from 5 to 30 parts based on 100 parts of fluorocarbon random copolymer. Concentrations of zinc oxide and iron oxide of greater than that that specified will provide no special benefit unless higher thermal conductivity is required. In a particular embodiment of the invention, the outer layer has 3.22 volume percent (10 parts) yellow iron oxide, and 3.01 volume percent (10 parts) tin oxide.

The composition may further include other fillers to impart such properties as thermal conductivity or cosmetic purposes. A brief list of such fillers includes but is not limited to tin oxide, copper oxide, graphite, carbon black, and aluminum oxide.

The zinc oxide particles employed as filler in the base cushion layer of a fuser member of the invention can be obtained from any convenient commercial source, e.g., Atlantic Equipment Engineers of Bergenfield, N. J. The particle size is a factor to control surface properties. Larger particles produce rougher surfaces. Particle sizes less than 10 micrometers have been found to be acceptable. In the examples presented below the zinc oxide particles were from 1 to 5 micrometers in diameter.

The yellow iron oxide particles employed as filler in the base cushion layer of a fuser member of the invention can be obtained from any convenient commercial source, e.g., Atlantic Equipment Engineers of Bergenfield, N.J. The particle size is a factor to control surface properties. Larger particles produce rougher surfaces. Particle sizes less than 10 micrometers have been found to be acceptable. In the examples presented below the zinc oxide particles were from 1 to 5 micrometers in diameter.

While not wishing to be bound by theory, it is believed that the yellow iron oxide and zinc oxide react at high temperatures to form zinc ferrite. This reaction is known to produce a tan pigment. It is believed that the zinc ferrite gives the advantages of the present invention.

To form the outer layer, the filler particles are mixed with the uncured polymer, crosslinking agent, and any other additives, such as an accelerator; shaped over the substrate, and cured. The fluorocarbon is cured by crosslinking with basic nucleophile. Basic nucleophilic cure systems are well known and are discussed, for example, in U.S. Pat. No. 4,272,179. One example of such a cure system combines a bisphenol as the crosslinking agent and an organophosphonium salt, as an accelerator.

The crosslinker is incorporated into the polymer as a cure-site subunit, for example, bisphenolic residues. Other examples of nucleophilic addition cure systems are sold commercially as DIAK™ No. 1 (hexamethylenediamine carbamate) and DIAK™ No. 3 (N,N'-dicinnamylidene-1,6-hexanediamine) by E.I. Dupont de Nemours & Co. Suitable uncured polymers are available commercially. In a particular embodiment of the invention, a vinylidene fluoride-co-hexafluoropropylene was used which can be represented as —(VF)(75)—(HFP)(25)—. This material is marketed by E.I. Dupont de Nemours and Company under the designation "Viton A™" and is referred to herein as "Viton A™". In another embodiment of the invention, a vinylidene fluoride-co-hexafluoropropylene was used which can be represented as —(VF)(42)—(HFP)(58)—. This material is marketed by Minnesota Mining and Manufacturing, St. Paul, Minn., under the designation "Fluorel FX-2530™" and is referred to herein as "FX-2530™". Other suitable uncured vinylidene fluoride-co-hexafluoropropylenes and vinylidene fluoride-co-tetrafluoroethylene-co-hexafluoropropylenes are available, for example, Fluorel FX-9038™.

The molecular weight of the uncured polymer is largely a matter of convenience, however, an excessively large or excessively small molecular weight would create problems, the nature of which are well known to those skilled in the art. In a preferred embodiment of the invention the uncured polymer has a number average molecular weight in the range of about 100,000 to 200,000.

The layer is constructed over the substrate by comprising the steps of:
(a) providing a substrate;
(b) providing a mixture having:
(i) a fluorocarbon random copolymer having subunits of:

—(CH$_2$ CF$_2$)$_x$—, —CF$_2$CF(CF$_3$)$_y$—, and —(CF$_2$ CF$_2$)$_z$—, wherein x is from 30 to 90 mole percent,
y is from 10 to 70 mole percent,
z is from 0 to 34 mole percent;
x+y+z equals 100 mole percent;
(ii) a particulate filler having zinc oxide and yellow iron oxide; and
(iii) a crosslinking agent and a crosslinking accelerator; and
(c) applying the mixture to the base cushion and curing the applied mixture to crosslink the fluorocarbon random copolymer.

In cases where it is intended that the fuser member be heated by an internal heater, it is desirable that outer layer have a relatively high thermal conductivity, so that the heat can be efficiently and quickly transmitted toward the outer surface of the fuser member that will contact the toner intended to be fused. (Depending upon relative thickness, it is generally even more desirable that the base cushion layer and any other intervening layers have a relatively high thermal conductivity. Suitable materials for the base cushion layer are discussed below.)

Some fusing systems use a release oil, such as a PDMS oil, to prevent offset, that is, to aid the roll in releasing from the toner it contacts during the fusing operation. During use, the oil is continuously coated over the surface of the fuser member in contact with the toner image. The fuser member of the invention can be used with polydimethylsiloxane, amino functionalized polydimethylsiloxane or mercapto functionalized polydimethylsiloxane release oils at normally used application rates or at reduced application rates, from about 0.5 mg/copy to 10 mg/copy (the copy is 8.5 by 11 inch 20 pound bond paper.

The outer layer of the fuser member of the invention is substantially resistant to release oil induced swelling. In a preferred embodiment of the invention, the change in size due to swelling is less than 0.1 to 1.0 percent. In an even more preferred embodiment of the invention, the change in size due to swelling is less than 0.01 to 0.1 percent.

The thickness of the base cushion and outer layers and the composition of the base cushion layer can be chosen so that the base cushion layer can provide the desired resilience to the fuser member, and the outer layer can flex to conform to that resilience. The thickness of the base cushion and outer layers will be chosen with consideration of the requirements of the particular application intended. Usually, the outer layer would be thinner than the base cushion layer. For example, base cushion layer thickness in the range from 0.6 to 5.0 mm have been found to be appropriate for various applications. In some embodiments of the present invention, the base cushion layer is about 2.5 mm thick, and the outer layer is from about 25 to 30 micrometers thick.

Suitable materials for the base cushion layer include any of a wide variety of materials previously used for base cushion layers, such as the condensation cured polydimethylsiloxane marketed as EC4952 by Emerson Cuming. An example of a condensation cured silicon rubber base cushion layer is GE 4044 marketed by General Electric of Waterford, N.Y. An example of an addition cured silicone rubber is Silastic J RTV marketed by Dow Corning applied over a silane primer DC-1200 also marketed by Dow Corning.

In a particular embodiment of the invention, the base cushion is resistant to cyclic stress induced deformation and hardening. Such materials when subjected to cyclic stress using an MER, as above discussed, exhibit changes in length and hardness (storage modulus) of less than about 20 percent. Examples of suitable materials are filled condensation-crosslinked PDMS elastomers disclosed in U.S. Pat. No. 5,269,740 (copper oxide filler), U.S. Pat. No. 5,292,606 (zinc oxide filler), U.S. Pat. No. 5,292,562 (chromium oxide filler), U.S. Pat. No. 5,480,724 (tin oxide filler), U.S. Pat. No. 5,336,539 (nickel oxide filler). These materials all show reasonable heat conductivities and much less change in hardness and creep than EC4952 or the PDMS elastomer with aluminum oxide filler. Additional suitable base cushions are disclosed in U.S. Pat. No. 5,466, 533. The patents and patent applications mentioned in this paragraph are hereby incorporated herein by reference.

The core of the fuser member is usually cylindrical in shape. It comprises any rigid metal or plastic substance. Metals are preferred when the fuser member is to be internally heated, because of their generally higher thermal conductivity. Suitable core materials include, e.g., aluminum, steel, various alloys, and polymeric materials such as thermoset resins, with or without fiber reinforcement. The core can be a support which has been conversion coated and primed with metal alkoxide primer in accordance with U.S. Pat. No. 5,474,821, which is hereby incorporated by reference.

The fuser member is mainly described herein in terms of embodiments in which the fuser member is a fuser roll having a core, a base cushion layer overlying the core, and an outer layer superimposed on the base cushion. The invention is not, however, limited to a roll, nor is the invention limited to a fusing member having a core bearing two layers: the base cushion layer and the outer layer. The fuser member of the invention can have a variety of outer configurations and layer arrangements known to those skilled in the art. For example, the base cushion layer could be eliminated or the outer layer described herein could be overlaid by one or more additional layers.

The invention is further illustrated by the following Examples and Comparative Examples.

EXAMPLES 1–7

A cylindrical stainless steel core was cleaned with dichloromethane and dried. The core was then primed with a uniform coat of a metal alkoxide type primer, Dow™. 1200 RTV Prime Coat primer, marketed by Dow Corning Corporation of Midland, Mich.; which contains: light aliphatic petroleum naphtha (85 weight percent), tetra (2-methoxyethoxy)-silane (5 weight percent), tetrapropyl orthosilicate (5 weight percent), and tetrabutyl titanate (5 weight percent). Silastic. RTM. J RTV room temperature vulcanizing silicone rubber, marketed by Dow Corning Corporation of Midland, Mich.; was then mixed with catalyst and injection molded onto the core and cured at 232° C. for 2 hours under 75 tons/inch$^2$ of pressure. The roller was then removed from the mold and baked in a convection oven with a temperature ramp increasing to 23° C. substantially uniformly over 24 hours and then maintaining that temperature for an additional 24 hours. After air cooling, EC4952 marketed by Emerson Cumming Division of W. R. Grace and Co. of Connecticut was blade coated directly onto the Silastic J layer, then cured for 12 hours at about 210° C., followed by 48 hours at 218° C. in a convection oven. After air cooling, the EC4952 was ground to a thickness of 20 mils. The cured EC4952 was corona discharged for 15 minutes at 750 watts and an outer layer was applied.

Fluorocarbon polymer was mixed as indicated in Table 1 with varying amounts of yellow iron oxide and zinc oxide. The volume fraction of yellow iron oxide was held constant. Each of the formulations was mixed with 2.5 g of Viton™ Curative 20 and 6g of Viton™ curative 30. The formulations were all mixed on a two-roll mill then dissolved to form a 25 weight percent solids solution in methyl ethyl ketone. Part of the resulting material was ring coated onto the cured EC4952 layer, air dried for 16 hours, baked with 24 hour ramp to 260° C. and then a 24 hour soak at 260° C. The Silastic J layer had a thickness of 380 mils. The resulting outer layer of fluorocarbon polymer had a thickness of 1 mil. The remainder of the material was cast to a film and allowed to dry for 3 days. Afterwards the cast films were baked with 24 hour ramp to 260° C. and then a 24 hour soak at 260° C.

EXAMPLES 8–12

Substantially the same procedures were followed as in Example 1–7, except yellow iron oxide content was varied and the volume fraction of zinc oxide was held constant as indicated in Table 1.

COMPARATIVE EXAMPLES 1–6

Substantially the same procedures were followed as in Example 1–7, except that no yellow iron oxide was added as indicated in Table 1.

COMPARATIVE EXAMPLES 7–9

Substantially the same procedures were followed as in Example 1–7, except that in lieu of yellow iron oxide, brown iron oxide was added as indicated in Table 2.

Materials Testing

The mechanical properties were measured on an Instron Model 4206 Series IX Materials Testing System 5. Tensile stress-at-break, strain-at-break and Young's modulus were measured using a 100 lb load cell. The crosshead speed was 2 in/min. Temperature was 73° F. Specimen gauge length was 16.51 mm. Five replicate measurements were made according to ASTM test methods#77.

In order to determine the extent of cure samples of the plaques of the examples and counter examples were swollen in Methylethylketone (MEK) for 2 days at room temperature. The swell was calculated as the percentage increase in mass. As the uncured fluoroelastomer dissolves completely, the lower the MEK swell the more cured. Different advantages are seen from varying the degree of cure a higher degree of cure (lower MEK swell) will in general have more mechanical integrity and better wear resistance. However as the cure propagates through vinylidene fluoride which is also the site which can react with functionalized release fluids a lower degree of cure (higher MEK swell) can signify a higher potential to interact with functionalized release fluids.

The wear rate test of compression-molded slabs was performed using a Norman Abrader Device (Norman Tool Inc., Ind.). For this test, the Abrader Device was modified by replacing the standard grommet wheel with an aluminum rod (1.1 inch in length and 0.625 inch in diameter), placing a renewable paper strip on the samples, and running the tests at about 350° F. 480 cycles were ran on each sample and the depth of the wear track was measured on a Federal Surfanalyzer 4000.

Toner Release Test

The test samples are employed to evaluate the toner offset and release force characteristics of the fuser member coating. Two samples are cut approximately 1-inch square of each example. One of these squares is left untreated by release agent (the dry sample). To the surface of the other sample is applied in unmeasured amount of Xerox aminofunctionalized PDMS 8R79.

Each sample is incubated overnight at a temperature of 175° C. Following this treatment, the surface of each sample is wiped with dichloromethane. Each sample is then soaked in dichloromethane for one hour and allowed to dry before off-line testing for toner offset and release properties.

Each sample is tested in the following manner:

A one-inch square of paper covered with unfused polyester toner is placed in contact with a sample on a bed heated to 175° C., and a pressure roller set for 80 psi is locked in place over the laminate to form a nip. After 20 minutes the roller is released from the laminate.

The extent of offset for each sample is determined by microscopic examination of the sample surface following delamination. The following numerical evaluation, corresponding to the amount of toner remaining on the surface, is employed.

1 0% offset
2 1–20% offset
3 21–50% offset
4 51–90% offset
5 91–100% offset

Qualitative assessment of the force required for delamination of the aper from the sample is as follows:

1 low release force
2 moderate release force
3 high release force

The plaques of the mixtures were cast into aluminum boats for cure. It was noticed and completely unexpected that significant improvements to the adhesion of the fluoroelastomer ser to aluminum were achieved. The adhesion of the materials to the aluminum was measured by peeling the coating off the ed above. Results are shown in Table 6.

TABLE 1

| Sample | Viton A (g) | Volume Fraction ZnO | Volume Fraction Yellow Fe2O3 |
|---|---|---|---|
| E1 | 100 | 0.2 | 3.22 |
| E2 | 100 | 0.5 | 3.22 |
| E3 | 100 | 1 | 3.22 |
| E4 | 100 | 2 | 3.22 |
| E5 | 100 | 5 | 3.22 |
| E6 | 100 | 7 | 3.22 |
| E7 | 100 | 10 | 3.22 |
| E8 | 100 | 3.01 | 0.5 |
| E9 | 100 | 3.01 | 1 |
| E10 | 100 | 3.01 | 2 |
| E11 | 100 | 3.01 | 5 |
| E12 | 100 | 3.01 | 10 |
| CE1 | 100 | 1 | 0 |
| CE2 | 100 | 2 | 0 |

TABLE 1-continued

| Sample | Viton A (g) | Volume Fraction ZnO | Volume Fraction Yellow Fe2O3 |
|---|---|---|---|
| CE3 | 100 | 3 | 0 |
| CE4 | 100 | 4 | 0 |
| CE5 | 100 | 5 | 0 |
| CE6 | 100 | 10 | 0 |

TABLE 2

| Sample | Viton A (g) | Volume Fraction ZnO | Volume Fraction Yellow Fe2O3 |
|---|---|---|---|
| CE7 | 100 | 3.01 | 1 |
| CE8 | 100 | 3.01 | 3 |
| CE9 | 100 | 3.01 | 6 |

TABLE 3

| Volume Fraction ZnO | MEK swell (%) |
|---|---|
| E1 | 155.0 |
| E2 | 163.0 |
| E3 | 95.5 |
| E4 | 125.0 |
| E5 | 122.0 |
| E6 | 90.1 |
| E7 | 103.0 |
| CE1 | 326.4 |
| CE2 | 263.5 |
| CE3 | 228.9 |
| CE4 | 170.9 |
| CE5 | 191.6 |
| CE6 | 158.2 |
| CE7 | 260 |
| CE8 | 496 |
| CE9 | 382 |

Table 3 shows the significant improvement to the extent of cure of the fluoroelastomer as evidenced by the dramatic decrease in the MEK swell by the incorporation of the yellow iron oxide. Table 3 further shows that brown iron oxide (CE7-CE9) does not similarly decrease the MEK swell.

TABLE 4

| Sample | Stress-at-Break (MPa) | Strain-at-Break | Modulus (MPa) |
|---|---|---|---|
| E1 | 2.56 | 365 | 5.70 |
| E2 | 3.54 | 339 | 5.66 |
| E3 | 3.82 | 323 | 8.17 |
| E4 | 4.87 | 399 | 6.46 |
| E5 | 6.24 | 455 | 5.49 |
| E6 | 6.44 | 424 | 6.75 |
| E7 | 6.13 | 367 | 7.44 |
| CE1 | 3.14 | 998 | 1.45 |
| CE2 | 3.55 | 968 | 1.20 |
| CE3 | 3.35 | 851 | 1.46 |
| CE4 | 4.03 | 206 | 4.58 |
| CE5 | 6.62 | 105 | 6.29 |
| CE6 | 6.70 | 186 | 3.65 |

Table 4 shows that the presence or absence of the yellow iron oxide does not significantly affect the stress-at-break. However, significant improvements are seen to both the Modulus and the strain-at-break.

TABLE 5

| Sample | Stress-at-Break (MPa) | Strain-at-Break (MPa) | Modulus (MPa) |
|---|---|---|---|
| E9 | 2.68 | 370 | 4.19 |
| E10 | 2.62 | 289 | 6.29 |
| E11 | 6.93 | 449 | 4.20 |
| CE7 | 2.23 | 323 | 3.58 |
| CE8 | 2.89 | 419 | 3.52 |
| CE9 | 3.42 | 496 | 4.38 |

Table 5 shows a comparison between the use of the two different forms of iron oxide, yellow and brown. Table 4 shows similar stress-at-breaks until higher amounts of yellow iron oxide are incorporated. For the most part little difference is observed in the mechanical properties for the different choices of types of iron oxide.

TABLE 6

| Sample | wear | release | dry offset | amino offset |
|---|---|---|---|---|
| E9 | 4.00 | 1 | 2.00 | 1.5 |
| E10 | 1.70 | 1 | 1.80 | 1.2 |
| E11 | 0.60 | 1 | 1.80 | 1.5 |
| CE7 | 4 | 1 | 2.00 | 2 |
| CE8 | 4 | 2 | 2.00 | 2 |
| CE9 | 1.3 | 2 | 2.00 | 1.5 |

Table 6 shows the effect of the use of the two different types of iron oxide, yellow (E9–E 11) and brown (CE7–CE9). In terms of wear, the choice of iron oxide significantly impacts the materials properties. The use of brown iron oxide (CE7–CE9) detrimentally impacts release. While not tremendously affecting the dry offset of the material, the amino offset is not aided by the use of brown iron oxide (CE7–CE9) as it is by the yellow iron oxide (E9–E11).

TABLE 7

| Volume Fraction ZnO | Adhesion to Aluminum (g/6 mm) |
|---|---|
| E1 | 85.2 |
| E2 | 63.5 |
| E3 | 63.1 |
| E4 | 42.7 |
| E5 | 55.0 |
| E6 | 57.4 |
| E7 | 55.9 |
| E8 | 172.8 |
| E9 | 184.4 |
| E10 | 77.8 |
| E11 | 29.1 |
| E12 | 171.1 |
| CE1 | 27.94 |
| CE2 | 32.44 |
| CE3 | 51.56 |
| CE4 | 61.63 |
| CE5 | 63.64 |
| CE6 | 66.88 |
| CE7 | 125.7 |
| CE8 | 74.6 |
| CE9 | 29.7 |

Table 7 shows the dramatic effect of the incorporation of iron oxide, both yellow and brown, of the ability of the fluoroelastomer to adhere to aluminum.

IN SUMMARY

Tables 2 and 4 show the improvement in mechanical properties gained by the addition of iron oxide.

Table 3 shows that only the yellow iron oxide can impact the extent of cure as shown through the MEK swell.

Table 5 shows that only yellow iron oxide can yield the mechanical properties, release, and offset properties needed for a viable fuser member.

The above data and description show that the combination of yellow iron oxide in conjunction with zinc oxide to replace the in general basic metal oxide metal hydroxide shows significant improvement of attainable properties. The positive attributes such as resistance to wear, extent of cure, stress-at-break and adhesion to aluminum are maximized while negative attributes such as propensity to offset, lack of release, and excessive strain-at-break are minimized. The invention has been described in detail with particular reference to certain preferred embodiments thereof, but it should be appreciated that variations and modifications can be effected within the scope of the invention.

What is claimed is:

1. A coating composition comprising a cured fluorocarbon random copolymer having subunits of:

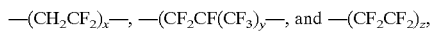

wherein x is from 30 to 90 mole percent, y is from 10 to 70 mole percent, z is from 0 to 34 mole percent; and x+y+z equal 100 mole percent;

the layer further including particulate filler having zinc oxide and yellow iron oxide.

2. The coating composition of claim 1 wherein the zinc oxide is present in an amount from 5 to 30 parts based on 100 parts of fluorocarbon random copolymer.

3. The coating composition of claim 1 wherein the yellow iron oxide is present in an amount form 5 to 30 parts based on 100 parts of fluorocarbon random copolymer.

4. The coating composition of claim 1 wherein the composition further comprises an additional filler.

5. The coating composition of claim 1 wherein the polymer is nucleophilic addition cured.

6. The coating composition of claim 1 wherein the polymer is crosslinked by biphenolic residues.

7. The coating composition of claim 1 wherein x is from 40 to 80 mole percent, y is from 10 to 60 mole percent, and z is from 0 to 34 mole percent.

8. The coating composition of claim 1 wherein x is from 42 to 75 mole percent, y is from 14 to 58 mole percent, and z is 0.

9. The coating composition of claim 1 wherein x is greater than 40 mole percent.

10. A fuser member comprising a core and a layer on the core, the layer comprising a cured fluorocarbon random copolymer having subunits of:

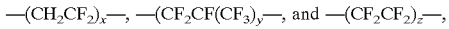

wherein x is from 30 to 90 mole percent, y is from 10 to 70 mole percent, z is from 0 to 34 mole percent; and x+y+z equal 100 mole percent;

the layer further including particulate filler having zinc oxide and yellow iron oxide.

11. The fuser member of claim 10 further comprising a base cushion layer between the core and the cured fluorocarbon layer.

12. The fuser member of claim 10 wherein the cured fluorocarbon layer forms a toner release layer.

13. A method of making fuser member comprising:

providing a core;

applying to the core a coating composition containing a mixture of:

(i) a fluorocarbon random copolymer having subunits of:

wherein x is from 30 to 90 mole percent, y is from 10 to 70 mole percent, z is from 0 to 34 mole percent;

x+y+z equal 100 mole percent; and (ii) a particulate filler having zinc oxide and yellow iron oxide; and (iii) a crosslinking agent; and curing the applied coating composition.

14. The method of claim 13 wherein a base cushion layer is provided on the core and the coating composition is applied to the base cushion layer.

* * * * *